United States Patent
Bhatti et al.

(10) Patent No.: US 7,281,390 B2
(45) Date of Patent: Oct. 16, 2007

(54) SELF-POWERED EVAPORATIVE COOLER

(75) Inventors: Mohinder Singh Bhatti, Amherst, NY (US); Ilya Reyzin, Williamsville, NY (US); Donald John Enzinna, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 159 days.

(21) Appl. No.: 11/222,521

(22) Filed: Sep. 9, 2005

(65) Prior Publication Data

US 2007/0056309 A1    Mar. 15, 2007

(51) Int. Cl.
*F28D 5/00*    (2006.01)

(52) U.S. Cl. ........................................... 62/310

(58) Field of Classification Search ............... 62/121, 62/310, 314, 426
See application file for complete search history.

(56) References Cited

U.S. PATENT DOCUMENTS

| | | | |
|---|---|---|---|
| 3,880,670 A * | 4/1975 | Shinn | 429/38 |
| 4,002,040 A * | 1/1977 | Munters et al. | 62/121 |
| 5,187,946 A * | 2/1993 | Rotenberg et al. | 62/314 |
| 5,206,094 A * | 4/1993 | Katz | 429/26 |
| 6,497,107 B2 * | 12/2002 | Maisotsenko et al. | 62/121 |
| 6,705,096 B2 | 3/2004 | Maisotsenko | 62/121 |
| 6,779,351 B2 * | 8/2004 | Maisotsenko et al. | 62/121 |
| 6,826,948 B1 | 12/2004 | Bhatti | 73/40.5 R |
| 2003/0014983 A1 * | 1/2003 | Maisotsenko et al. | 62/121 |

* cited by examiner

*Primary Examiner*—Melvin Jones
(74) *Attorney, Agent, or Firm*—Patrick M. Griffin

(57) ABSTRACT

An indirect evaporative cooler assembly includes staggered wet and dry channels. An electric fan moves air through the assembly. Air passes through the wet channels where a material wicks moisture stored in a reservoir into the wet channels. As a result, the side walls of the wet channels are evaporatively cooled. Air moving through dry channels is cooled by the cooling of the walls of the wet channels, and by the presence of louvered convoluted fins in the dry channels that allow for air circulation and further heat dissipation. The wet channels are distinguished by the presence of an electrolyte saturating the material, and electrodes disposed on either side of the material combined to generate an electrical current. Pairs of electrodes are connected in series, and generate electricity to power the electric fan. An auxiliary power source is activated when the voltage from the electrodes drops below a pre-determined level.

18 Claims, 3 Drawing Sheets

SELF-POWERED EVAPORATIVE COOLER

BACKGROUND OF THE INVENTION

1. Field of the Invention

The present invention relates to indirect evaporative cooler assemblies used to cool air for delivery into rooms and other spaces.

2. Description of the Prior Art

Various indirect evaporative cooler assemblies for cooling air, using external power sources in order to operate a component, such as an electric fan, to move ambient air through the assembly, are well known in the prior art. Examples of such devices are disclosed in the U.S. Pat. No. 6,338,258 to Lee. Further, the use of wicking material to supply moisture to the wet channels of the assembly is well known in the prior art. Examples of such devices are disclosed at U.S. Patent Application Publication No. 2003/0145609 A1 to Maisotenko et al., and U.S. Pat. No. 6,705,096 to Maisotenko et al.

The use of electrolyte impregnated wicking material used in conjunction with electrodes is disclosed in U.S. Pat. No. 6,826,948 to Bhatti et al. In the Bhatti '948 patent, this configuration was used to create a low resistance electrical path in the presence of a leak in a cooling system.

Although there are numerous indirect evaporative coolers, there remains an opportunity to create a self-powered indirect evaporative cooler, using the evaporative cooling action within the wet channels to generate electricity to power the electric fan required to move air through the assembly.

SUMMARY OF THE INVENTION AND ADVANTAGES

The subject invention provides an indirect evaporative cooler assembly for cooling air for delivery into rooms and other spaces, using a combination of dry channels and wet channels, with wicking material saturated with an electrolyte, adjacent positive and negative electrodes for the purpose of producing electrical current to power an electric fan used to move air through the assembly.

The subject invention is distinguished by the fact that it capitalizes on the presence of the wicking material and water or other liquid used in the wet channels to generate electricity to power the electric fan, rendering it self-powered, without interfering with the operation of the assembly or sacrificing cooling capacity.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
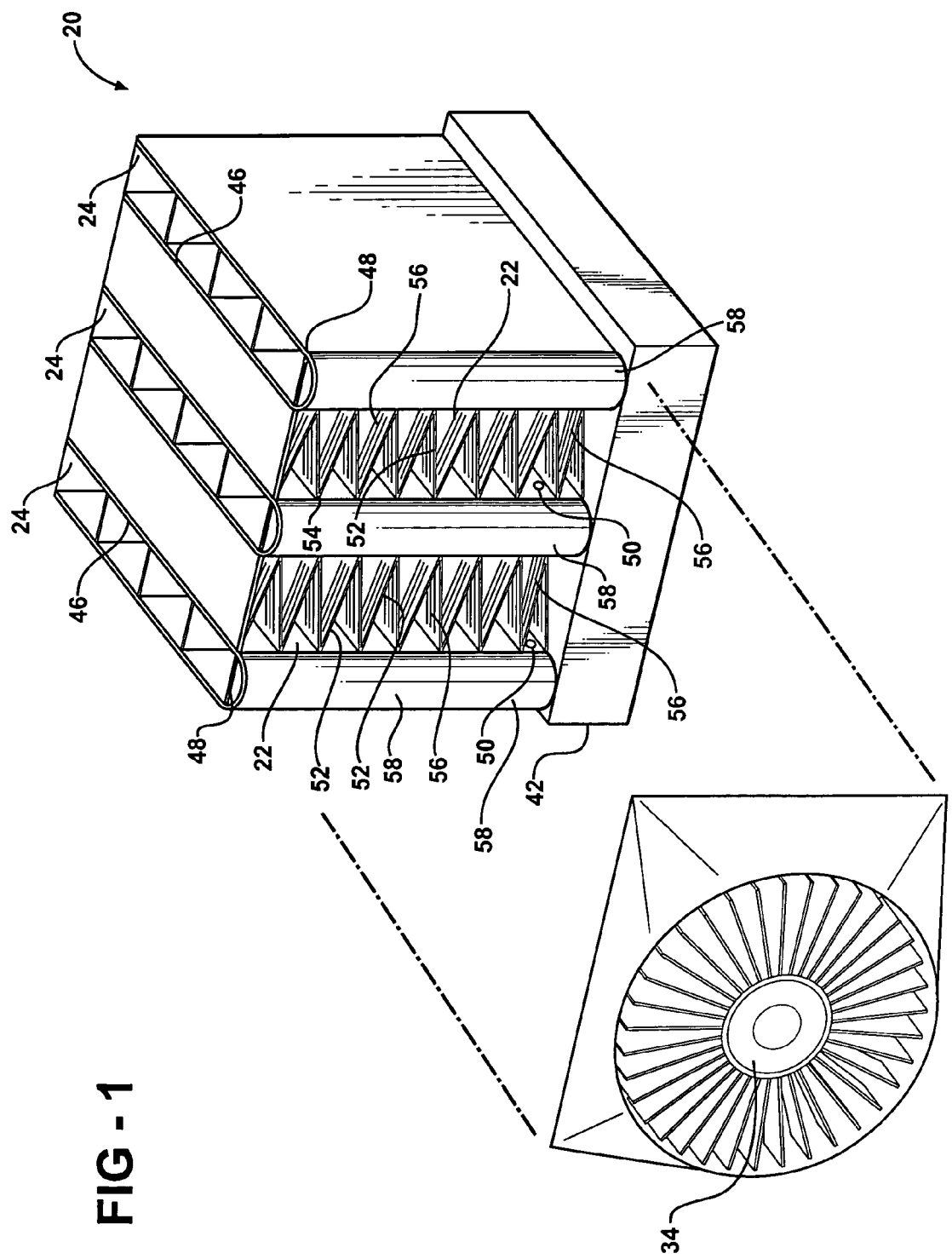
FIG. 1 is a perspective view of the subject invention.
Figure 2:
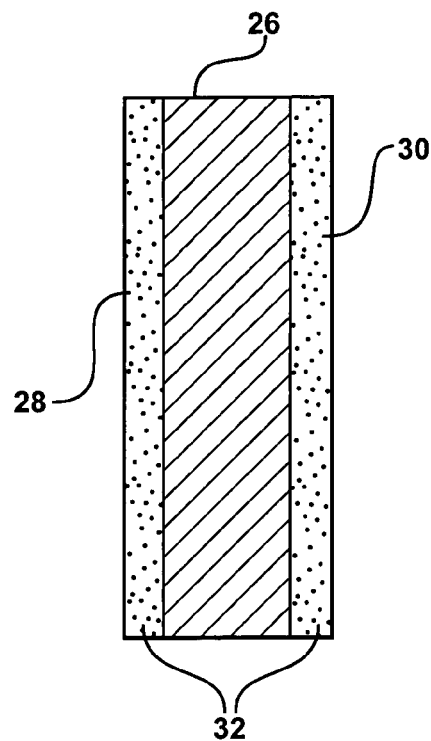
FIG. 2 is a top view of the electrodes separated by the material.
Figure 3:
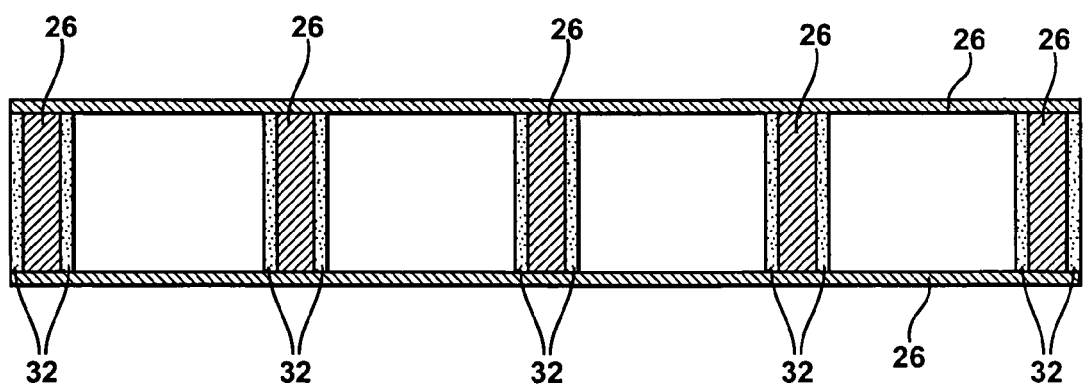
FIG. 3 is the top view of a series of the electrodes with wicking material within the wet channel of the assembly.

Referring to the Figures, wherein like numerals indicate corresponding parts throughout the several views, an indirect evaporative cooler assembly is shown generally at 20. The assembly includes a dry channel 22 for passing ambient air, a wet channel 24 for passing air and in heat conducting relationship with the dry channel 22, and a moisture containing material 26 is disposed in the wet channel 24 for evaporating moisture into air passing through the wet channel 24 to cool air passing through the dry channel 22.

The material 26 is saturated with an electrolyte for producing electrical voltage. A positive electrode 28, and a negative electrode 30, sandwich the material 26 so that the material 26 is disposed between the electrodes 32 for establishing current flow between the electrodes 32. The electrolyte can comprise a non-conductive metallic salt such as sodium-bicarbonate or sodium-chloride, rendered conductive in the presence of water or other liquid.

An electric fan 34 for moving air through the indirect evaporative cooler assembly 20 is connected to and powered by electrical current from the electrodes 32.

An auxiliary power source 36 for supplying electricity to the electric fan 34 includes a switching device 38 that signals the supply of electricity from the auxiliary power source 36 in response to the level of electricity produced by the electrodes 32 dropping below a predetermined level. Also included is an energy storage device 40 for holding energy generated by the electrodes 32.

A reservoir 42 feeds moisture to the material 26 for activating the electrolyte and for evaporative cooling of the air. The material 26 comprises a wick extending into the reservoir 42 for feeding the moisture by capillary action. Also included is a dry system detector 44 for signaling a low level of water in the reservoir 42.

A plurality of the wet channels 24 are defined by a box-like structure. The adjacent wet channels 24 are separated by one of the dry channels 22. The dry channels 22 and the wet channels 24 are disposed transversely to one another for directing air flow horizontally through the dry channels 22 and directing air flow vertically through the wet channels 24.

The wet channels 24 include oppositely facing side walls 46. A plurality of pairs of the positive and negative electrodes 32, 28, 30 separated by the material 26 sandwiched between each pair of the electrodes 32 and extend between the side walls 46. The pairs of electrodes 32 are spaced from one another horizontally along the box-like structure. The material 26 is disposed on the side walls 46 between adjacent pairs of the electrodes 32. The respective pairs of electrodes 32 are connected in series.

The walls 46, 48 of the wet channels 24 define a plurality of passageways 50 between the wet channels 24 and the dry channels 22 for allowing a portion of air flowing into the dry channels 22 to enter the wet channels 24.

A plurality of convoluted fins 52 are spaced vertically from one another and extend between the side walls 46 of the wet channels 24 within the dry channels 22. The convoluted fins 52 are wired in and brazed at apexes 54 within the dry channels 22 from the side walls 46 of the wet channels 24 for holding and vertically separating the convoluted fins 52 in the dry channels 22. The convoluted fins 52 include a plurality of louvers 56 interrupting air in the boundary layer to augment heat transfer from air to the convoluted fins 52, i.e., enhancing the heat transfer with the air flow.

The wet channels 24 include end walls 48 extending between the side walls 46 and an air flow divider 58 is disposed over each of the end walls 48 for directing and dividing air flow into the adjacent dry channels 22.

Figure 4:
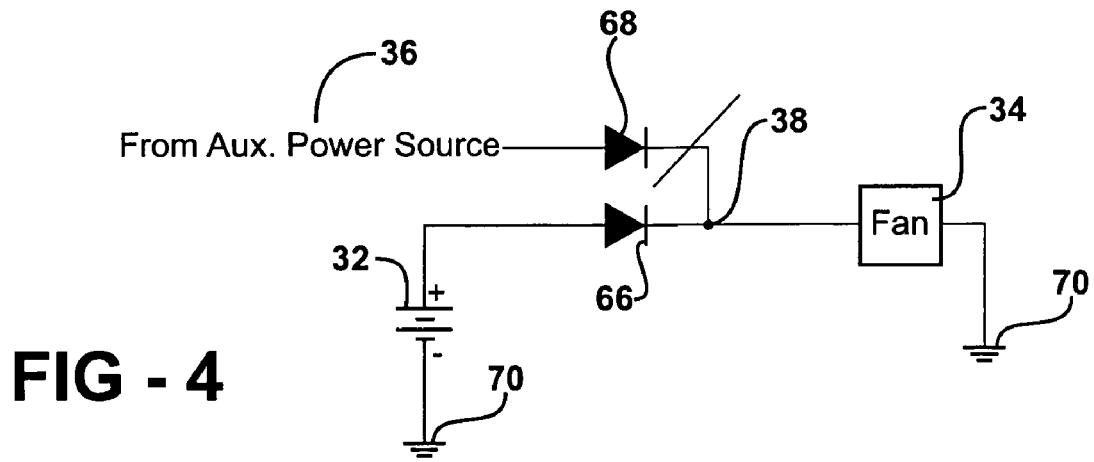
FIG. 4 is a schematic of a simple circuit implementing the power supply generated from the pairs of electrodes in the wet channels, and the auxiliary power source.

The circuitry necessary for implementing the dual power supply is illustrated in FIG. 4. The electrodes 32 supply electricity through the primary diode 66. The auxiliary power source 36 supplies electricity through the auxiliary diode 68. A common ground point 70 completes the circuit.

Figure 5:
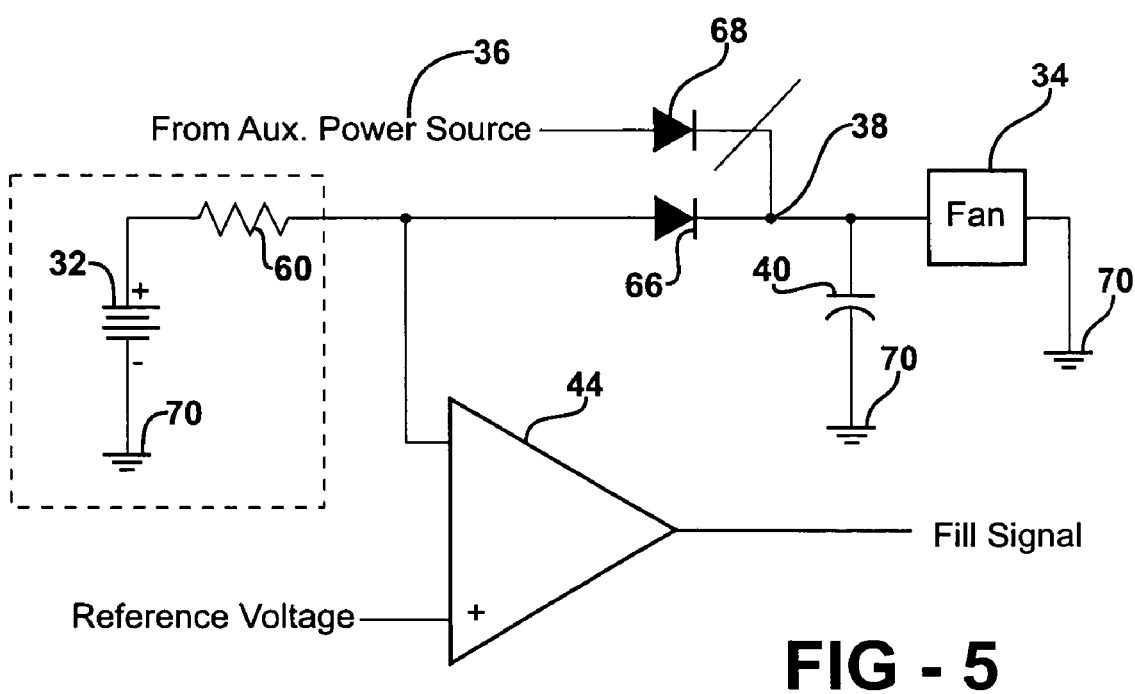
FIG. 5 is a schematic of an enhanced circuit including a provision for impedance, a dry system detector and energy storage.

An enhanced circuit is illustrated in FIG. 5. The circuit includes a resistor 60 for circuit impedance. When the electric fan 34 is operating, the voltage generated by the electrodes 32 is reduced. As the moisture in the material 26 is dried up, the resistance 60 increases. The switching device 38 monitors the voltage output of the electrodes 32. As the material 26 continues to dry up, the output voltage continues to drop below the reference voltage causing the switching device 38 to signal filling the reservoir 42 with water. Also described in the enhanced circuit is a generalized energy storage device 40 such as a capacitor or rechargeable battery.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. An indirect evaporative cooler assembly comprising;
a dry channel for passing ambient air,
a wet channel for passing air and in heat conducting relationship with said dry channel,
a moisture containing material disposed in said wet channel for evaporating moisture into air passing through said wet channel to cool air passing through said dry channel, characterized by an electrolyte saturating said material for producing electrical voltage,
a positive electrode,
a negative electrode, said material being disposed between said electrodes for establishing current flow between said electrodes, and
an electric fan for moving air through said cooler, said electrical fan being connected to and powered by electrical current from said electrodes.

2. An assembly as set forth in claim 1 including an auxiliary power source for supplying electricity to said electric fan including a switching device signaling the supply of electricity from said auxiliary power source in response to the level of electricity produced by said electrodes dropping below a predetermined level.

3. An assembly as set forth in claim 2 including an energy storage device for holding energy generated by said electrodes.

4. An indirect evaporative cooler assembly comprising;
a dry channel for passing ambient air,
a wet channel for passing air and in heat conducting relationship with said dry channel,
a moisture containing material disposed in said wet channel for evaporating moisture into air passing through said wet channel to cool air passing through said dry channel, characterized by an electrolyte saturating said material for producing electrical voltage,
a positive electrode,
a negative electrode, said material being disposed between said electrodes for establishing current flow between said electrodes, and
a reservoir for feeding moisture to said material for activating said electrolyte and for evaporative cooling of the air.

5. An assembly as set forth in claim 4 wherein said material comprises a wick extending into said reservoir for feeding the moisture by capillary action.

6. An assembly as set forth in claim 4 including a dry system detector for signaling a low level of water in said reservoir.

7. An indirect evaporative cooler assembly comprising;
a dry channel for passing ambient air,
a wet channel for passing air and in heat conducting relationship with said dry channel,
a moisture containing material disposed in said wet channel for evaporating moisture into air passing through said wet channel to cool air passing through said dry channel, characterized by an electrolyte saturating said material for producing electrical voltage,
a positive electrode,
a negative electrode, said material being disposed between said electrodes for establishing current flow between said electrodes, and
a plurality of said wet channels each defined by box-like structure.

8. An assembly as set forth in claim 7 wherein said adjacent wet channels are separated by one of said dry channels.

9. An assembly as set forth in claim 8 wherein with said dry channels and said wet channels are disposed transversely to one another for directing air flow horizontally through said dry channels and directing air flow vertically through said wet channels.

10. An assembly as set forth in claim 9 wherein said wet channels include oppositely facing side walls, and including a plurality of pairs of said positive and negative electrodes separated by said material sandwiched between each pair of said electrodes and extending between said side walls, said pairs of electrodes being spaced from one another horizontally along said box-like structure.

11. An assembly as set forth in claim 10 wherein said material is disposed on said side walls between adjacent pairs of said electrodes.

12. An assembly as set forth in claim 9 wherein said pairs of electrodes are connected in series.

13. An assembly as set forth in claim 10 wherein said walls of said wet channels define a plurality of passageways between said wet channels and said dry channels for allowing a portion of air flowing into said dry channels to enter said wet channels.

14. An assembly as set forth in claim 13 including a plurality of convoluted fins spaced vertically from one another and extending between said side walls of said wet channels within said dry channels.

15. An assembly as set forth in claim 14 wherein said convoluted fins are wired in and brazed at apexes within said dry channels from the side walls of the wet channels for holding and vertically separating the convoluted fins in the dry channels.

16. An assembly as set forth in claim 15 wherein said convoluted fins include a plurality of louvers for enhancing the heat transfer with the air flow.

17. An assembly as set forth in claim 14 wherein said wet channels include end walls extending between said side walls and including an air flow divider disposed over each of said end walls for directing air flow into said adjacent dry channels.

18. An indirect evaporative cooler assembly comprising;
a dry channel for passing ambient air,
a wet channel for passing air and in heat conducting relationship with said dry channel,
a moisture containing material disposed in said wet channel for evaporating moisture into air passing through said wet channel to cool air passing through said dry channel, characterized by an electrolyte saturating said material for producing electrical voltage, wherein said electrolyte comprises non-conductive metallic salt rendered conductive in the presence of water,
a positive electrode, and
a negative electrode, said material being disposed between said electrodes for establishing current flow between said electrodes.

* * * * *